United States Patent [19]
Peltz et al.

[11] 3,786,463
[45] Jan. 15, 1974

[54] FLUID LEVEL SENSOR

[75] Inventors: John R. Peltz; Nikolaus A. Szeverenyi, both of Warren, Pa.

[73] Assignee: GTE Sylvania Incorporated, Seneca Falls, N.Y.

[22] Filed: Mar. 20, 1972

[21] Appl. No.: 236,149

[52] U.S. Cl. ............................ 340/244 R, 337/380
[51] Int. Cl. ................................................ G08b 21/00
[58] Field of Search .................. 340/244 R; 337/380

[56] References Cited
UNITED STATES PATENTS

| | | | |
|---|---|---|---|
| 2,619,566 | 11/1952 | Mahoney | 340/244 R |
| 3,335,243 | 8/1967 | Canaday | 340/244 R |
| 3,474,372 | 10/1969 | Davenport | 337/380 |

*Primary Examiner*—Thomas B. Habecker
*Attorney*—Norman J. O'Malley et al.

[57] ABSTRACT

An apparatus for detecting the presence or absence of fluid at a predetermined level within a container. The apparatus comprises an electrical circuit and a sensor device electrically joined to the circuit and positioned within a wall of the container. The device comprises a housing of conductive material, a conducting member within the housing and electrically insulated therefrom, a tip member of conductive material affixed to the housing, a resistive element having first and second opposing ends, and a bimetallic member affixed respectively to the second opposing end of the resistive element and adapted for engaging the first opposing end when the temperature about the bimetallic member exceeds a predetermined level.

16 Claims, 4 Drawing Figures

PATENTED JAN 15 1974 3,786,463

FLUID LEVEL SENSOR

BACKGROUND OF THE INVENTION

This invention relates to fluid sensing apparatus and more particularly to an apparatus for providing a signal indication when the fluid in a container is below a predetermined level.

Previously known methods for detecting the level of a fluid within a container have varied from mechanically operated floats to probing devices for immersion into the fluid being measured. In altogether too many devices of this variety, the end product was either of large physical size, cumbersome to operate, or required considerable external equipment or circuitry, which also resulted in relatively high costs for manufacturing such devices.

It is believed, therefore, that a device which can detect the presence or absence of fluid at a predetermined level within a container and is compact in size, operable in almost all types of fluids, and relatively inexpensive to manufacture would constitute an advancement in the art.

OBJECTS AND SUMMARY OF THE INVENTION

It is therefore a primary object of the invention to provide a liquid level sensing apparatus which obviates the previously described disadvantages of devices of the prior art.

It is a further object of the present invention to provide a sensing apparatus which is adaptable for operation in almost all types of fluids.

Still another object of the present invention is to provide a sensing apparatus which is relatively inexpensive to manufacture.

In accordance with one aspect of the invention there is provided an apparatus for detecting the presence or absence of fluid at a predetermined level within a container. This apparatus comprises an electrical circuit having a potential source, a switching means for opening and closing the circuit, and a current indicating means for indicating when the current in the circuit exceeds an established level. Additionally, the apparatus comprises a sensor device electrically connected to the circuit and having a housing, an electrically conducting member positioned within the housing and insulated therefrom, a tip member bonded to the housing, a resistive element having first and second opposing ends of electrically conductive material, and a bimetallic member affixed to the second opposing end of the resistive element. This bimetallic member is adapted for engaging the first opposing end of the element when the temperature surrounding the bimetallic member exceeds a predetermined level.

DETAILED DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

Figure 1:
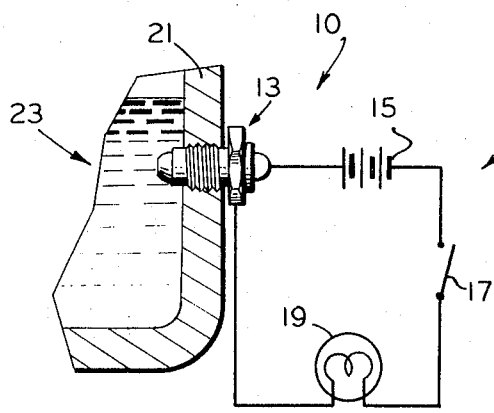
FIG. 1 is a side elevational view of one embodiment of the present invention.

In FIG. 1 one embodiment of a fluid level detecting apparatus 10 in accordance with the invention is illustrated and shown to comprise an electrical circuit 11 and a sensor device 13. Circuit 11 comprises a potential source illustrated as battery 15, a switching means 17 for opening and closing circuit 11, and a current indicating means, illustrated as bulb 19. Sensor device 13 is electronically connected to circuit 11 and is shown to be positioned within wall 21 of a fluid holding container 23. Although the particular method illustrated for positioning sensor 13 is to place it in the side of container 23, sensor 13 may be placed in either the bottom or top of the container depending on the level of fluid desired or the configuration of the container. Furthermore, although the method shown for retaining sensor 13 into wall 21 is by screw threads (the sensor being provided with external screw threads to mate with corresponding threads in wall 21), othermethods for retention are possible, an example being either welding or soldering. The method illustrated is preferred, however, because it provides relative ease of removal of sensor 13 in the event of damage to the sensor or container.

Figure 2:
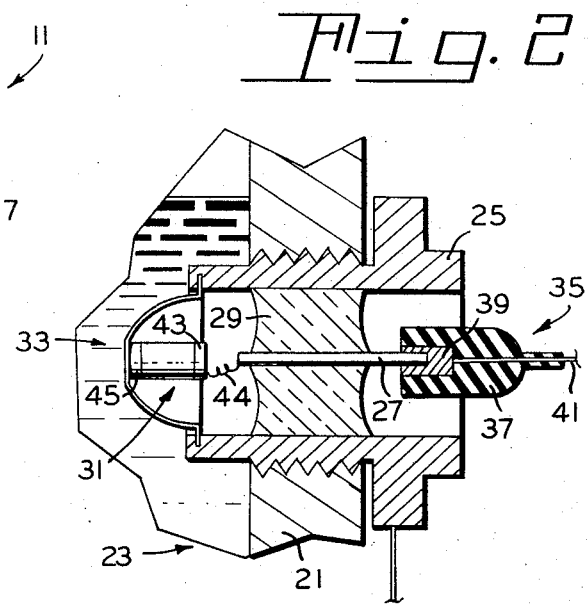
FIG. 2 is an enlarged view of the sensor device of FIG. 1.

In FIG. 2 can be seen a more detailed view of sensor 13, which is shown to comprise a housing 25 of electrically conductive material, an electrical conducting member, illustrated as center post 27, which is positioned within housing 25 and insulated therefrom by electrically insulating material 29, a resistive element 31, and a tip member 33 of electrically conductive material. Center post 27 is electrically connected to circuit 11 via plug 35 illustrated as a body of insulative material 37 about a metallic socket 39 which in turn is connected to conducting wire 41. Plug 35 is but one means possible for providing this interconnection and is not meant as the sole method to which the invention is limited. Additional connecting means, including an alligator clip or even a single wire soldered to post 27 are possible. In the event that the atmosphere surrounding container 23 is not favorable to exposed electrical connections, a plug having an insulating cap to encompass the external portions of either post 27 or housing 25 is preferred.

Tip member 33, sealed in housing 25 to thereby encapsulated resistive element 31 therein, is adapted for being subjected to the fluid within container 23. A preferred material for tip member 33 is sold under the trade name "Rodar" and manufactured by the w. B. Driver Company of Newark, N.J., a subsidiary of the assignee of the proposed present invention. "Rodar," consisting essentially of 29 percent by weight nickel, 17 percent by weight cobalt, and the remainder essentially iron, is a suitable electrical conductor and possesses the additional property of relatively low thermal conductivity. This additional property, as will be further explained, is highly desirable to enhance the functioning characteristics of sensor 13. Resistive element 31, comprising first and second opposing ends 43 and 43 respectively is joined at first opposing end 43 to center post 27 by wire 44, and at second opposing end 45 to tip member 33. Both first and second opposing ends 43 and 45 are of electrically conductive material. A conductive material preferred by Applicant is a nickel-silver metallic alloy, although any of the well-known metals or metal alloys having good electrical conducting properties can be utilized.

Figure 3:
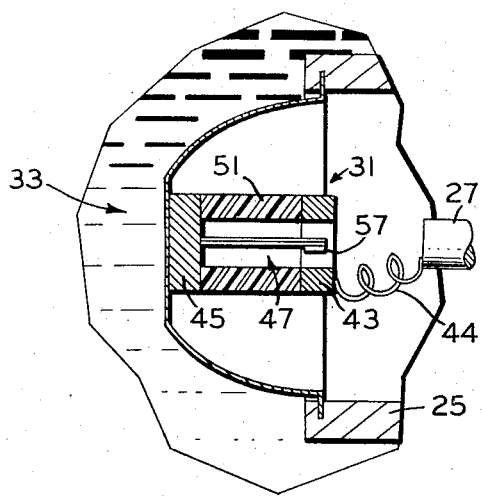
FIGS. 3 and 4 are enlarged views of various phases of operation of the sensor of FIG. 2.
Figure 4:
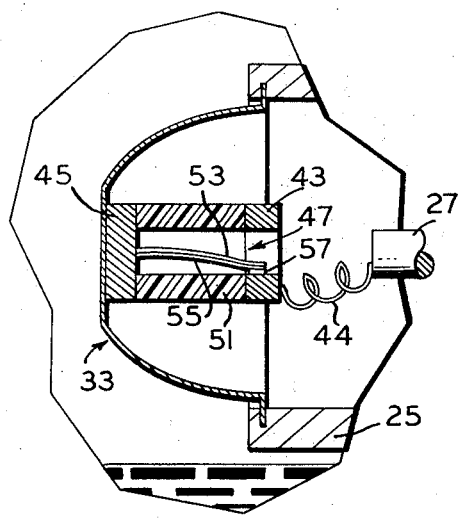

Bimetallic member 47, illustrated in FIGS. 3 and 4, posseses good electrical conducting properties and is affixed to second opposing end 45 of element 31. The position of member 47 with respect to the resistive material 51 and first opposing end 43 of element 31, is illustrated in FIG. 3 as the position which this member assumes when tip member 33 is subjected to the fluid within container 23. As will be explained, bimetallic member 47 is adapted for engaging first opposing end 43 when the fluid level drops below tip member 33.

Electrical connection between circuit 11 and housing 25 is accomplished simply by affixing via any of the conventional methods, i.e., welding, a wire from circuit 11 to any external portion of the housing. In the event that container 23 is of metallic nature or any material having good electrical conducting properties, circuit 11 may be connected thereto at any suitable location.

To operate apparatus 10, as shown in FIG. 1, switching means 17 is closed, thereby providing electrical current to circuit 11 and to sensor 13. A typical direction of current flow from battery 15 is through center post 27, wire 44 first opposing end 43 of resistive element 31, resistive material 51 of element 31, shown in FIG. 3, second opposing end 45 of element 31, tip member 33, housing 25 and thereafter back to circuit 11 where it passes through bulb 19. Because this current must pass through resistive material 51, which may be any material typically found in electrical resistors, it is not sufficient to activate bulb 19. Assuring that bulb 19 will not light under these conditions is easily accomplished by proper selection of corresponding elements in the sensor and circuit. One example of a workable circuit-sensor arrangement is to use a 12 volt battery connected to a bulb having a resistance of approximately 1 ohm. When using the combination, the desired resistance of the resistive material of element 31 is approximately 240 ohms. The resistance of other elements in sensor 13, particularly center post 27, tip member 33, housing 25, opposing ends 43 and 45, and bimetallic member 47 is minimal and may be considered as zero.

Electrical current through resistive material 51 causes it to become warm as is the case in almost all electrical resistors. The heat generated by this material is heat sinked at one end of element 31 through opposing end 45, tip member 33, and eventually into the surrounding fluid. Heat is also removed from element 31 by passing through opposing end 43, wire 44, center post 27, into insulative material 29, housing 25, and eventually into container wall 21. Provided tip member 33 remains subjected to the fluid within container 23, the quantity of heat generated in element 31 is sufficiently dissipated away from bimetallic member 47 and this member remains relatively stationary. However, when the fluid drops below tip member 33, as illustrated in FIG. 4, the heat dissipating ability of sensor 13 is substantially reduced. This occurs primarily because the fluid, which previously served as a heat sink for the majority of the heat generated in opposing end 45 is now absent.

The reduction in the heat dissipating ability of sensor 13 results in a substantial increase in temperature about member 47 to cause it to deflect and engage first opposing end 43. When this occurs, electrical current flowing from center post 27 through wire 44 and first opposing end 43 is permitted to by-pass resistive material 51 and pass directly to second opposing end 45 via the now deflected bimetallic member 47 because, as previously noted, the electrical resistance at this point is substantially less than that of the resistive material. The current then returns to bulb 19 through tip member 33 and housing 25 where it now is at a sufficient level to actuate the bulb. This in turn indicates to an operator that the fluid level of container 23 is below tip member 33. To further assure that the heat dissipating ability of sensor 13 will be appreciably reduced when the fluid in container 23 drops below tip member 33, it is preferred that the coefficient of the thermal conductivity of member 33 be relatively low. In the particular embodiment, tip member 33, comprised of the previously described Rodar, has a coefficient of thermal conductivity of approximately 12.0 BTU/(hr.) (sq.ft.) (°F per ft.).

The sensor device as illustrated is unique in another feature in that it provides a means whereby bulb 19 is sequentially actuated to more visibly indicate to the operator the low fluid level. This sequential actuation is achieved when the electrical current by-passing resistive material 51 passes through bimetallic member 47 for a sufficient period to allow material 51 to cool. This cooling lowers the temperature of resistive material 51 which causes member 47 to oppositely deflect and thereby disengage opposing end 43. The current thereafter must pass through resistive material 51 once again until the temperature surrounding member 47 reaches the level whereby member 47 will again deflect. This cycle of temperature changes indirectly raises and lowers the level of current flow in sensor 13 and circuit 11 and therefore causes bulb 19 to be sequentially lit. If desired, however, a steady signal to bulb 19 can be provided by use of an electrical or mechanical latching circuit or device which latches on to energize bulb 19 continuously after the first deflection of bimetallic member 47. Such latching circuits or devices can include an SCR, a latching relay, or similar circuits and devices. A bimetal utilized successfully in sensor 13 is Chace 2400 bimetal, manufactured by the W. M. Chace Company of Detroit, Mich., a subsidiary of the previously mentioned W. B. Driver Company. Chace 2400 bimetal has a high expanding side (illustrated as high expanding layer 53 in FIG. 4) consisting essentially of about 22 percent by weight nickel, 3 percent by weight chromium, with the remainder iron, and a low expanding side (illustrated as low expanding layer 55 in FIG. 4) consisting essentially of about 36 percent to 42 percent nickel with the remainder iron. An additional newly available bimetal also found suitable for use in sensor 13 is one produced by the W. M. Chace Company having a high expanding side consisting essentially of 22 percent nickel, 3 percent chromium, with the balance iron, and a low expanding side consisting essentially of about 30 percent to 35 percent nickel with the remainder iron. The high expanding side of the bimetal has a first coefficient of thermal expansion of from 0° to 150° F of at least $7.0 \times 10^{-6}$ per °F and a second coefficient of thermal expansion lower than the first over a temperature range from 150° to 600° F. The low expanding side of the bimetal has a first coefficient of expansion ranging from about $1.4 \times 10^{-6}$ per °F to about $6.0 \times 10^{-6}$ per °F over a temperature range of 0° to 150° F and a second coefficient of expansion of at least $7.0 \times$ $10^{-6}$ per °F over a temperature range from about 400° F to 600° F. This particular bimetal reduces many of the stresses found in prior art bimetals and results in improved overall operating conditions, especially in the higher temperature ranges. Depending on the configuration used for bimetallic member 47, as well as the initial spacing between this member and first opposing end 43 and the temperature required to cause their engaging, other bimetallic materials can be utilized successfully in this invention. For practical reasons however, bimetallic materials having operating characteristics substantially similar to those described are preferred.

To assure a sound electrical connection between deflected bimetallic member 47 and first opposing end 43, a contacting portion 57, preferably comprised of the better electrically conducting noble metals such as gold or silver, is affixed to the end of member 47, as illustrated in FIGS. 3 and 4.

In addition to providing means whereby an indication is given when the fluid within container 23 is below a certain level, apparatus 10 can be modified to perform other functions by relatively simple alterations to circuit 11, such as energizing other circuits or to operate other mechanisms such as audible signals, valving arrangements, and the like. For examples, circuit 11 can be modified to include a means for actuating a valving arrangement in a boiler to thereby either shut down a burner or to open a valve and permit more fluid to enter the container, depending on the pre-established fluid level setting.

Additionally, sensor device 13, as shown, is of relatively rugged construction and operable in almost all types of fluids.

Thus, there has been provided an apparatus for detecting the presence or absence of fluid at a predetermined level within a container. One of the unique features of this apparatus, that being the ability to provide a sequentially actuated current indicating means, has also been provided.

While there have been shown and described what are at present considered the preferred embodiments of the invention, it will be obvious to those skilled in the art that various changes and modifications may be made therein without departing from the scope of the invention as defined by the appended claims.

What is claimed is:

1. A sensor device comprising:
    a housing member defining a chamber;
    a thermally conductive tip member adapted for being exposed to a fluid, said tip member secured to said housing and forming a closure for said chamber and to prevent fluid entrance into said chamber;
    heater means within said chamber having first and second spaced apart portions, said second portion in heat conductive relationship to said tip member; and
    a heat responsive means secured at one end to said second spaced apart portion of said heater means and having a free end adapted for engaging said first spaced apart portion of said heater means only when the temperature surrounding said heat responsive means exceeds a predetermined level.

2. The sensor device according to claim 1 wherein said heater means within said chamber is an electrical resistive element.

3. The sensor device according to claim 1 wherein said thermally conductive tip member within said chamber is electrically conductive.

4. The sensor device according to claim 1 wherein said heat responsive means is a bimetallic member.

5. The sensor device according to claim 4 wherein said bimetallic member has a contacting portion of noble metal affixed thereto.

6. A sensor device according to claim 4 wherein said bimetallic member has a high expanding side of an alloy of nickel-chromium-iron and a low expanding side of an alloy of nickel-iron and wherein the differential in coefficients of thermal expansion between said high and low expanding sides is appreciably greater than from about 0° to about 150° F than from about 400° to about 600° F.

7. A sensing apparatus having a sensor device comprising:
    a housing member defining a chamber;
    a thermally conductive tip member adapted for being exposed to a fluid, said tip member secured to said housing and forming a closure for said chamber and to prevent fluid entrance into said chamber;
    heater means within said chamber having first and second spaced apart portions, said second portion in heat conductive relationship to said tip member;
    a heat responsive means secured at one end to said second spaced apart portion of said heater means and having a free end adapted for engaging said first spaced apart portion of said heater means only when the temperature surrounding said heat responsive means exceeds a predetermined level; and
    means for sensing when said first free end of said heat responsive means and said first spaced apart portion of said heater means are engaged.

8. The sensing apparatus according to claim 7 wherein said means for sensing when said free end of said heat responsive means and said first spaced apart portion of said element heater means are engaged is an electrical circuit comprising a source of electrical potential operatively connected to said heat responsive means and said first spaced apart portion for opening and closing said circuit and a current indicating means adapted for indicating electrical current in said circuit when said free end and said first spaced apart portion are engaged.

9. The sensing apparatus according to claim 8 wherein in said sensor device said heat responsive means is a bimetallic member.

10. The sensing apparatus according to claim 8 wherein in said sensor device said heater means element within said chamber is an electrical resistive element and is operatively connected to said source of electrical potential.

11. The sensing apparatus according to claim 10 wherein in said sensor device said thermally conductive tip member is electrically conductive and is operatively connected to said source of electrical potential and to said electrical resistive element.

12. In combination, a container having walls adapted for containing a fluid therein, a sensor device at least partially positioned within a wall of said container, said device comprising:
    a housing member defining a chamber;
    a thermally conductive tip member adapted for being exposed to a fluid, said tip member secured to said housing and forming a closure for said chamber and to prevent fluid entrance into said chamber;

heater means within said chamber having first and second spaced apart portions, said second portion in heat conductive relationship to said tip member;

a heat responsive means secured at one end to said second spaced apart portion of said heater means and having a free end adapted for engaging said first spaced apart portion of said heater means only when the temperature surrounding said heat responsive means exceeds a predetermined level; and means for sensing when said free end of said heat responsive means and said first spaced apart portion of said heater means are engaged.

13. The combination according to claim 12 wherein said means for sensing when said free end of said heat responsive member means and said first spaced apart portion of said element heater means are engaged is an electrical circuit comprising a source of electrical potential operatively connected to said heat responsive means and said first spaced apart portion for opening and closing said circuit and a current indicating means adapted for indicating electrical current in said circuit when said free end of said heat responsive means and said first spaced apart portion are engaged.

14. The combination according to claim 13 wherein in said sensor device said heat responsive element is a bimetallic member.

15. The combination according to claim 13 wherein in said sensor device said heater means element within said chamber is an electrical resistive element and is operatively connected to said source of electrical potential.

16. The combination according to claim 15 wherein in said sensor device said thermally conductive tip member is electrically conductive and is operatively connected to said source of electrical potential and to said electrical resistive element.

* * * * *

UNITED STATES PATENT OFFICE
CERTIFICATE OF CORRECTION

Patent No. 3,786,463  Dated January 15, 1974

Inventor(s) John R. Peltz and Nikolaus A. Szeverenyi

It is certified that error appears in the above-identified patent and that said Letters Patent are hereby corrected as shown below:

Col. 6, line 34, Claim 7 - delete "first"

Col. 6, line 40, Claim 8 - delete "element"

Col. 6, lines 52,53, Claim 10 - delete "element"

Col. 7, line 18, Claim 13 - delete "element"

Col. 8, line 7, Claim 14 - delete "element" and insert -- means --

Col. 8, line 10, Claim 15 - delete "element"

Signed and sealed this 10th day of December 1974.

(SEAL)
Attest:

McCOY M. GIBSON JR.  C. MARSHALL DANN
Attesting Officer  Commissioner of Patents